United States Patent
Knoblauch

(10) Patent No.: US 9,199,527 B2
(45) Date of Patent: Dec. 1, 2015

(54) DRIVE TRAIN OF A PURELY ELECTRICALLY ALL-WHEEL DRIVABLE MOTOR VEHICLE

(71) Applicant: Dr. Ing. h.c. F. Porsche Aktiengesellschaft, Stuttgart (DE)

(72) Inventor: Daniel Knoblauch, Obergruppenbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/363,009

(22) PCT Filed: Dec. 5, 2012

(86) PCT No.: PCT/EP2012/005012
§ 371 (c)(1),
(2) Date: Jun. 5, 2014

(87) PCT Pub. No.: WO2013/083266
PCT Pub. Date: Jun. 13, 2013

(65) Prior Publication Data
US 2014/0335999 A1    Nov. 13, 2014

(30) Foreign Application Priority Data
Dec. 5, 2011  (DE) .......................... 10 2011 056 046

(51) Int. Cl.
*B60K 1/02* (2006.01)
*B60K 23/08* (2006.01)
(Continued)

(52) U.S. Cl.
CPC ... *B60K 1/02* (2013.01); *B60K 1/00* (2013.01); *B60K 17/02* (2013.01); *B60K 17/12* (2013.01); *B60K 17/16* (2013.01); *B60K 17/348* (2013.01);
(Continued)

(58) Field of Classification Search
CPC .............................. B60K 1/00; B60K 23/0808
See application file for complete search history.

(56) References Cited

U.S. PATENT DOCUMENTS 6,615,946 B2  9/2003  Pasquini et al.
7,497,285 B1 *  3/2009  Radev ...................... 180/65.225
(Continued)

FOREIGN PATENT DOCUMENTS

WO    2007039730 A1    4/2007

OTHER PUBLICATIONS

International Search Report of Apr. 9, 2013.
(Continued)

*Primary Examiner* — Derek D Knight
(74) *Attorney, Agent, or Firm* — Gerald E. Hespos; Michael J. Porco; Matthew T. Hespos

(57) ABSTRACT

A drive train (1) of a purely electrically all-wheel drivable motor vehicle has a first axle (2) having a differential (23), a second axle (3) having a differential (26), and at least one electric machine (11, 32) for driving the two axles (2, 3). The at least one electric machine (11, 32) is arranged transversely to the direction of travel (4) of the motor vehicle and is connected to the first axle (2) of the drive train (1) via a spur gear (12). The first axle (2) and the second axle (3) each have a crown wheel (25). The crown wheels (25) are connected to each other via a shaft (27) that has pinions (28) at its respective ends, which engage into a respective crown wheel (25). The drive train allows retrofitting the drive train with simple construction, from an initial state with only one driven axle to all-wheel drive.

12 Claims, 1 Drawing Sheet

(51) Int. Cl.
    *B60K 1/00*         (2006.01)
    *B60K 17/02*       (2006.01)
    *B60K 17/35*       (2006.01)
    *B60K 17/12*       (2006.01)
    *B60K 17/16*       (2006.01)
    *B60K 17/348*      (2006.01)
    *B60K 17/356*      (2006.01)
    *F16H 48/20*       (2012.01)
    *B60L 11/18*       (2006.01)
    *B60L 15/20*       (2006.01)

(52) U.S. Cl.
    CPC ............... *B60K 17/35* (2013.01); *B60K 17/356* (2013.01); *B60K 23/0808* (2013.01); *B60L 11/1805* (2013.01); *B60L 15/2054* (2013.01); *F16H 48/20* (2013.01); *B60K 2001/001* (2013.01); *B60L 2220/42* (2013.01); *B60L 2240/421* (2013.01); *B60L 2240/423* (2013.01); *B60L 2240/486* (2013.01); *B60L 2260/28* (2013.01); *B60Y 2200/91* (2013.01); *Y10T 477/26* (2015.01)

(56) References Cited

U.S. PATENT DOCUMENTS

| | | |
|---|---|---|
| 8,388,486 B2 | 3/2013 | Ekonen et al. |
| 2006/0191168 A1 | 8/2006 | Casey et al. |
| 2011/0061961 A1* | 3/2011 | Liu et al. ........................ 180/242 |
| 2011/0259657 A1 | 10/2011 | Fuechtner |
| 2011/0275470 A1* | 11/2011 | Ekonen et al. ................ 475/198 |

OTHER PUBLICATIONS

German Search Report of Aug. 14, 2012.

* cited by examiner

DRIVE TRAIN OF A PURELY ELECTRICALLY ALL-WHEEL DRIVABLE MOTOR VEHICLE

BACKGROUND

1. Field of the Invention

The invention relates to a drive train of a purely electrically all-wheel drivable motor vehicle, with a first axle which has a differential, with a second axle which has a differential, and with at least one electric machine for driving the two axles.

2. Description of the Related Art

Such a drive train, which is used for an electrically drivable earth-moving vehicle or for an agricultural vehicle with four-wheel drive, is known from DE 600 13 340 T2. Said drive train has two electric machines which are arranged longitudinally with respect to the direction of travel above the one, rear axle and interact with a spur gearing which is arranged in front of the rear axle. The gearing is connected via one shaft or two shafts to the differentials which are assigned to the two axles, therefore to the rear axle and to the front axle.

It is the object of the present invention to provide a drive train in a motor vehicle to be operated purely electrically, in which, with structurally simple, in particular standardized, means, the drive train can be retrofitted from an initial state with only one driven axle to all-wheel drive.

SUMMARY OF THE INVENTION

The drive train of the purely electrically all-wheel drivable motor vehicle therefore has a first axle with a differential and a second axle with a differential. Furthermore, the drive train has at least one electric machine which is arranged transversely with respect to the direction of travel of the motor vehicle. Said at least one electric machine is connected to a first axle of the drive train via a spur gearing. The first axle and the second axle each have a crown wheel. The crown wheels are connected via a shaft, wherein the latter has, at the respective ends thereof, a pinion which engages in a respective crown wheel. Said pinions assigned to the shaft and/or the corresponding crown wheels can differ in size, and therefore bring about different transmission ratios in interaction with the assigned crown wheels.

In particular, a single electric machine is provided, or else two electric machines are provided, of which one can be decoupled by means of a switchable clutch. It is therefore not required for the two electric machines to be driven simultaneously.

The drive train can be of very compact design because of the described design in the region of the first axle and the electric machine and the spur gearing located in between. The torque of the electric machine can be transmitted highly efficiently via the spur gearing to the first shaft.

The drive train is preferably used in a motor vehicle which is in the form of a passenger vehicle. Said passenger vehicle is in particular a sports car. Said motor vehicle, in particular the passenger vehicle or the sports car, is preferably in the form of a rear drive. The at least one electric machine is therefore arranged in the rear region of the motor vehicle or of the drive train. The first axle is therefore located in front of the electric machine. By means of the electric machine, first of all the first axle is driven, and the second axle, which is in particular the front axle, is driven via the crown wheel of the first axle, the shaft and the crown wheel of the second axle.

In principle, however, the motor vehicle can be in the form of a front drive. In this case, the electric machine is therefore located in the region of the second, front axle of the drive train, in particular in front of said axle.

The wheels assigned to the drive train are connected thereto in particular individually via propeller shafts. In this case, the drive train does not have any rigid axles.

The differential of the first axle can be designed differently. It is in particular in the form of a conventional, and therefore open, differential or is in the form of a torque-vectoring differential with a planetary gearing and brakes. Such a differential is known from the prior art. It enables the wheels of the first axle to be driven with a different torque by means of the electric machine.

In interaction with the shaft and the pinions thereof, the crown wheels of the first and second axles serve to transmit a torque from the first axle to the second axle. It is of particular advantage structurally here if the crown wheel is provided in each case on the differential of the first axle and of the second axle. In particular, the crown wheel is connected to a differential housing of the differential. In addition, the shaft can also have a controllable clutch, in particular a hang-on clutch, in order to couple or to be able to decouple the two axles.

This results in the simple possibility of retrofitting a purely electrically driven vehicle with only one driven axle with all-wheel drive without an additional electric machine for the other axle. In particular, this results in the possibility of using, for essential subregions of the drive train according to the invention, technology which is already known from conventional all-wheel vehicles, and therefore technology which is used in known all-wheel vehicles driven by means of internal combustion engines. This relates in particular to the transmission of torque from the first axle to the second axle. For example, it is known that the shaft additionally has the controllable clutch, in particular the hang-on clutch. The shaft can also be designed in a known manner as a propeller/cardan shaft. There is in particular the possibility of using the combination, which is already known from conventional all-wheel vehicles, of propeller/cardan shaft with hang-on clutch and connected vehicle axle, without further modifications, in the drive train according to the invention.

Provision can optionally be made for the spur gearing to be switchable. In principle, however, this is not required because a gearing with a constant transmission ratio is entirely sufficient.

The spur gearing has an intermediate shaft preferably between the output shaft of the electric machine and the first axle. This permits a greater reduction in the rotational speed of the electric machine.

Further features of the invention emerge from the dependent claims, the attached drawing and the description of the preferred exemplary embodiment, which is reproduced in the drawing, without being limited thereto.

DETAILED DESCRIPTION OF THE PREFERRED EMBODIMENT

Figure 1:
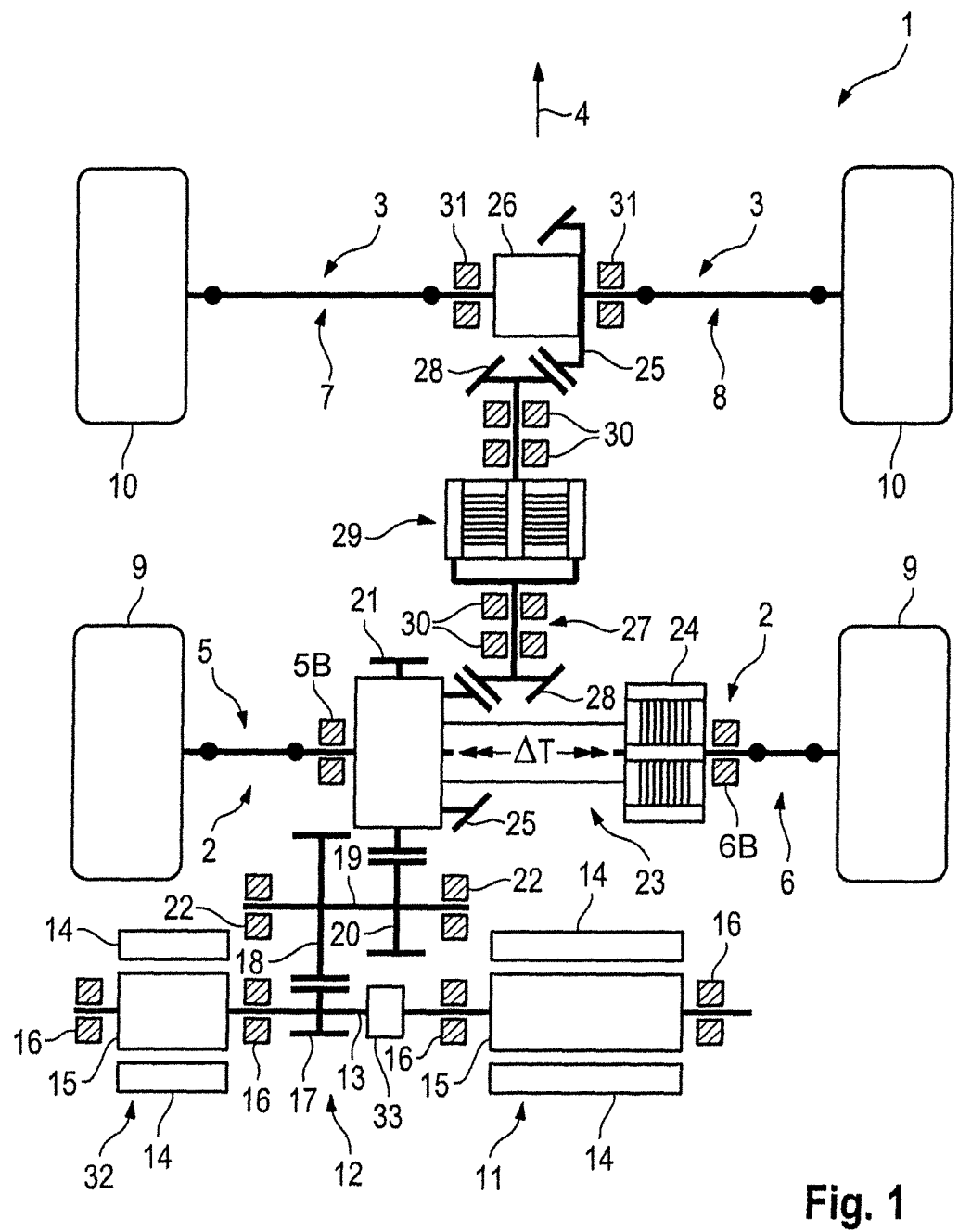
FIG. 1 shows a schematic diagram of the embodiment of the drive train according to the invention.

The exemplary embodiment according to FIG. 1 illustrates a drive train 1 for a purely electrically drivable motor vehicle, which is in particular a passenger vehicle, specifically a sports car.

The drive train 1 with individual wheel suspension has a first, rear axle 2 and a second, front axle 3. With respect to the forward direction of travel 4 of the motor vehicle, referred to in short below as direction of travel, the rear axle 2 has a left axle section 5 and a right axle section 6. The front axle 3 has a left axle section 7 and a right axle section 8. Rear wheels 9 are connected in the axle sections 5 and 6, and front wheels 10 are connected to the axle sections 7 and 8. The axle sections 5 to 8 mentioned each have propeller shafts.

Two electric machines 11, 32 and a spur gearing 12 of the drive train 1 are arranged behind the rear axle 2. The electric machines are arranged transversely with respect to the direction of travel 4. The axis of rotation of the electric machines 11 and 32, illustrated by the respective output shaft 13 thereof, is therefore arranged parallel to the rear axle 2. The stator of the respective electric machine 11, 32 is denoted by the reference number 14, and the rotor of the respective electric machine 11, 32, to which rotor the driven shaft 13 is connected, is denoted by the reference number 15. The respective rotor 15 is mounted in two bearings 16.

The gearing 12 having the spur toothing has a pinion 17, which is connected to the output shafts 13 of the electric machines 11, 32 for rotation therewith, and a spur gear 18 meshing with said pinion, wherein said spur gear is mounted in an intermediate shaft 19 of the spur gearing 12 and is connected to the intermediate shaft 19 for rotation therewith. A pinion 20 which interacts with a spur gear 21 is connected to the intermediate shaft 19, on that side of said intermediate shaft 19 which faces the electric machine 11. Said spur gear drives the rear axle 2 via a differential.

The output shaft 13 of the electric machine 11 is assigned a switchable separating clutch 33, and therefore drive is possible only via the electric machine 32 or via the two electric machines 11, 32.

The output shaft 13 and the intermediate shaft 19 are arranged parallel to each other; furthermore, the intermediate shaft 19 is arranged parallel to the rear axle. The intermediate shaft 19 is mounted in bearings 22.

The electric machines 11, 32 are therefore connected via the spur gearing 12 to the rear axle 2 in order to drive the latter. In addition, said rear, electrically driven axle 2 has a differential 23. The differential 23 is either a conventional, and therefore open, differential or a torque-vectoring differential with a planetary gearing and brakes 24. The axle sections 5 and 6 of the rear axle 2 are mounted in bearings 5B and 6B respectively and in the differential 23.

In order to be able to drive the second, front axle, both the first, rear, driven axle 2 and the second, front axle 3 each have a crown wheel 25. The one crown wheel 25 is provided on the differential 23, in particular is connected to a differential housing of said differential 23. The other crown wheel 25 is provided on a differential 26 of the front axle 3, in particular is likewise connected to a differential housing of said differential 26. The two crown wheels 25 are connected via a shaft 27 which, at the respective ends thereof, bears a pinion 28. The shaft 27 additionally has a controllable clutch 29 in the manner of a hang-on clutch. Since a respective pinion 28 engages in a respective crown wheel 25, a torque can be transmitted from the first, driven, rear axle 2 to the second, front axle 3 by means of the shaft 27. The crown wheels 25 and/or the pinions 28 can differ in size.

When the differential 23 is in the form of a torque-vectoring differential, different torques can be introduced into the axle sections 5 and 6. The possibility of torque vectoring is illustrated in the FIGURE by the indication ΔT.

This results in a simple possibility of retrofitting a purely electrically driven vehicle with only one driven axle with all-wheel drive, according to the exemplary embodiment of the rear axle 2, without an additional electric machine, and therefore only using the one electric machine 11. In particular, the possibility arises of using the combination, which is known from conventional all-wheel vehicles, of the shaft 27, which can be in the form of a propeller/cardan shaft, with a clutch 29, which is in particular in the form of a hang-on clutch, and a connected vehicle axle, without further modifications, in a purely electric vehicle.

The bearings of the shaft 27 that are arranged on both sides of the clutch 29 are denoted by the reference number 30. The respective axle sections 7 and 8 are mounted in a bearing 31 and in the differential 26.

The invention claimed is:

1. A drive train of a purely electrically drivable motor vehicle, comprising:
    a first axle with a first differential having a first differential housing;
    a second axle with a second differential having a second differential housing;
    at least one electric machine disposed so that the first axle is between the at least one electric machine and the second axle, the at least one electric machine being configured for driving at least the first axle, the at least one electric machine being arranged transversely with respect to a forward direction of travel of the motor vehicle and being connected to the first axle of the drive train via a spur gearing;
    first and second crown wheels disposed respectively on the first and second differential housings; and
    a shaft having first and second ends provided respectively with first and second pinions that are engageable respectively with the first and second crown wheels on the first and second differential housings, wherein the shaft is selectively incorporated into the drive train for achieving all-wheel drive of the vehicle without reconfiguring remaining components of the drive train.

2. The drive train of claim 1, wherein the first axle is a rear axle of the motor vehicle.

3. The drive train of claim 2, wherein the at least one electric machine is arranged behind the rear axle.

4. The drive train of claim 1, wherein the drive train is a drive train of a sports car.

5. The drive train of claim 1, wherein the at least one electric machine is the only electric machine in the drive train.

6. The drive train of claim 1, wherein the at least one electric machine is a first electric machine, and wherein the drive train further has a second electric machine disposed so that the first axle is between the second electric machine and the second axle, wherein one of the electric machines can be decoupled from the drive train by a switchable clutch.

7. The drive train of claim 6, wherein the first axle is a rear axle of the motor vehicle and wherein the electric machines are disposed on a common axis parallel to and rearward of the rear axle.

8. The drive train of claim 1, wherein the differential of the first axle is a conventional, open differential or a torque-vectoring differential with a planetary gearing and brakes.

9. The drive train claim 1, wherein the spur gearing has an intermediate shaft between an output shaft of the electric machine or output shafts of the electric machines and the first axle.

10. The drive train of claim 1, wherein the spur gearing is not switchable.

11. The drive train of claim 1, wherein the shaft has a controllable hang-on clutch.

12. The drive train of claim 1, wherein the spur gearing is switchable.

\* \* \* \* \*